A
United States Patent Office 2,934,535
Patented Apr. 26, 1960

2,934,535
2-AMINO-4-TRIFLUOROMETHYLANILINO-S-TRIAZINES

Blaine M. Sutton, Philadelphia, Pa., assignor to Smith, Kline & French Laboratories, Philadelphia, Pa., a corporation of Pennsylvania No Drawing. Application August 13, 1957
Serial No. 677,819

4 Claims. (Cl. 260—249.9)

This invention relates to new 2-amino-4-trifluoromethylanilino-s-triazines which have useful pharmacodynamic properties.

More specifically, the compounds of this invention have utility as diuretics and in the treatment of pathological conditions such as congestive heart, renal disorders and cirrhosis of the liver. In particular, the compounds are extremely potent diuretics and have a surprisingly low degree of toxicity. Further, these compounds have characteristics which make them unusually valuable as therapeutic agents.

Organic mercurials used as diuretic drugs possess certain undesirable features. They are toxic, producing fatal and nonfatal reactions as well as systemic mercury poisoning. Further, mercurial diuretics are most desirably administered by intramuscular injection. In contrast, the non-mercurial diuretics of this invention are well-tolerated, comparatively nontoxic and orally effective.

It is readily apparent to one skilled in the art that a drug with diuretic action which can be safely administered orally is of great usefulness in therapy. The predominant advantage of an orally active drug is its convenience to the patient, by making self-medication possible.

The 2-amino-4-trifluoromethylanilino-s-triazines of this invention are represented by the general formula:

Formula I

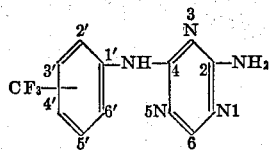

where the trifluoromethyl group is in position 2', 3', or 4'.

This invention also includes nontoxic salts of the above bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling, or reacted with an excess of the acid in aqueous immiscible solvent, such as ethyl ether or chloroform, with the desired salt separating directly. Exemplary of such organic salts are those with methanesulfonic, ethanedisulfonic and benzene sulfonic acids. Exemplary of such inorganic salts are those with hydrochloric, hydrobromic, sulfuric, sulfonic, phosphoric and nitric acids. Of course, these salts may also be prepared by the classical method of double decomposition of appropriate salts which is well-known to the art.

The novel triazines of this invention are prepared from the properly substituted biguanide derivatives according to the following synthetic procedure:

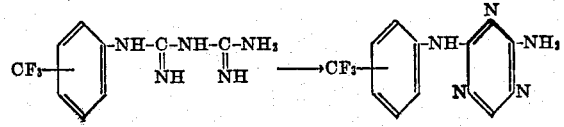

The trifluoromethylphenyl substituted biguanides, used as intermediates as shown above, are readily prepared by the reaction of the appropriate aminobenzotrifluoride with dicyandiamide. In this method, a suspension of the aminobenzotrifluoride in hydrochloric acid, containing an equimolar amount of hydrogen chloride, is heated at reflux with from 0.9 to 1.0 equivalent of dicyandiamide for from 20 to 60 minutes. The reaction mixture is worked up by cooling and filtering the biguanide hydrochloride salt. An aqueous solution of this solid is made basic and extracted with ether. The dried ether extract is evaporated and the resulting residue crystallized to give the desired free biguanide base which may be purified by recrystallization. As an alternative work-up procedure, the above reaction mixture is made basic and filtered to give the solid biguanide base directly which is then washed with water and optionally purified by recrystallization.

The intermediate substituted biguanides are converted to the corresponding triazine derivatives by reaction with formic acid or a formic acid ester such as ethyl formate. A solution of the biguanide in a solvent such as methanol is treated with an excess of ethyl formate, preferably about 1.5 equivalents, and the mixture allowed to stand at room temperature for several hours or heated at reflux for approximately one hour. The product is isolated from the cooled reaction mixture by filtration. Alternatively, the biguanide dissolved in an excess of a formic acid solution, preferably a concentrated aqueous solution containing about 1.5 equivalents of formic acid, is heated at reflux for from about five to ten hours. The reaction mixture is worked up by removing by distillation approximately one-half of the excess formic acid, quenching in cold water and making the resulting solution basic. The separated solid is washed, dissolved in dilute acid and the solution adjusted to a pH of 3.0–3.5. The precipitate is filtered, washed and recrystallized to give the desired triazine.

The following examples will serve to illustrate compounds in accordance with this invention and their preparation.

Example I

To a stirred suspension of 93.0 g. of 4-aminobenzotrifluoride in 224 ml. of distilled water is added 58 ml. of 36% hydrochloric acid. The suspension is heated to 50° C. and stirred as 47.0 g. of dicyandiamide is added. The resulting mixture is then heated at reflux for 30 minutes, with stirring. The reaction mixture is allowed to stand overnight, cooled and filtered. The separated solid is redissolved in 3 l. of distilled water and after decolorizing with activated charcoal, the aqueous solution is made strongly alkaline with 40% sodium hydroxide solution. The separated oil is extracted with ether. The dried ether extract is evaporated under reduced pressure to leave an oily residue which partially solidified on standing. The impure solid is recrystallized from methylene chloride to give colorless crystals of 1-(4'-trifluoromethylphenyl)-biguanide, M.P. 147 to 150° C.

To a stirred solution of 45.0 g. of 1-(4'-trifluoromethylphenyl)-biguanide in 90 ml. of dry methanol, 20.0 g. of ethyl formate is added rapidly at room temperature. After two hours, the crystalline solid which separated is removed by filtration to give the product, 2-amino-4-(4'-trifluoromethylanilino)-s-triazine, M.P. 248 to 250° C.

A solution of the triazine base in approximately five volumes of dimethylformamide is acidified with 10% isopropanolic hydrogen chloride to yield the hydrochloride salt, M.P. 241 to 242.5° C. (d.).

Example II

A mixture of 167.0 g. of 3-aminobenzotrifluoride, 104.0 g. of hydrochloric acid and 400 ml. of distilled water is stirred while 84.0 g. of dicyandiamide is added. After the addition is complete, the mixture is refluxed for 30 minutes. The reaction mixture is allowed to stand overnight and then chilled. The crystalline separation is filtered, washed with cold distilled water and dried to give 1-(3'-trifluoromethyl-phenyl)-biguanide hydrochloride, M.P. 205 to 206° C.

A solution of 40.0 g. of the hydrochloride salt in 250 ml. of distilled water is made alkaline with 40% sodium hydroxide solution and the separated oil extracted into ether. The dried ether extract is evaporated in vacuo and the residual viscous oil triturated with hexane to give the solid free base, 1-(3'-trifluoromethylphenyl)-biguanide, M.P. 68 to 71° C.

To a solution of 32.0 g. of 1-(3'-trifluoromethylphenyl)-biguanide in 75 ml. of methanol, 14.6 g. of ethyl formate is added with stirring. The mixture is heated at reflux for one hour, allowed to cool and filtered. The separated solid is recrystallized from methanol to give 2-amino-4-(3'-trifluoromethylanilino)-s-triazine, M.P. 210 to 211.5° C.

Dissolving 27.0 g. of the triazine base in 250 ml. of hot 5% aqueous hydrochloric acid yields 2-amino-4-(3'-trifluoromethylanilino)-s-triazine hydrochloride, M.P. 247 to 248° C. (d.).

*Example III*

To a solution of 4.6 g. of 2-aminobenzotrifluoride in 15 ml. of 7.5% hydrochloric acid is added 2.4 g. of dicyandiamide and the mixture stirred at reflux for 45 minutes. The reaction mixture is made basic with 10% sodium hydroxide solution. The solid which separates is removed by filtration, washed with water and recrystallized from boiling water to yield 1-(2'-trifluoromethylphenyl)-biguanide, M.P. 164 to 166° C.

A solution of 10.0 g. of 1-(2'-trifluoromethylphenyl)-biguanide in 80 ml. of 90% formic acid is heated at reflux for seven hours. Approximately one-half of the excess acid is removed by distillation, the residue poured into cold water and the mixture made basic with 40% sodium hydroxide solution. The resulting solid is filtered, washed with water, dissolved in 50 ml. of warm 5% hydrochloric acid and the solution filtered. The cooled filtrate is adjusted to a pH of 3.0–3.5 with 10% sodium acetate solution and the precipitated solid removed by filtration. The water-washed solid is recrystallized from warm methanol to give colorless crystals of 2-amino-4-(2'-trifluoromethylanilino)-s-triazine, M.P. 168 to 170° C.

A solution of 2.6 g. of the triazine base in 100 ml. of ethanol is treated with 1.0 g. of methanesulfonic acid. Trituration with ether and cooling yields the methanesulfonate salt.

What is claimed is:

1. Compounds selected from the group consisting of:

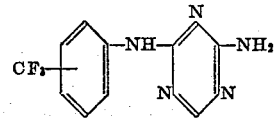

and nontoxic acid addition salts thereof.

2. The compound of the formula:

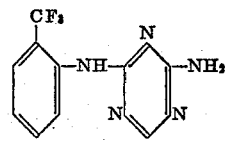

3. The compound of the formula:

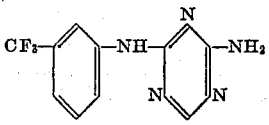

4. The compound of the formula:

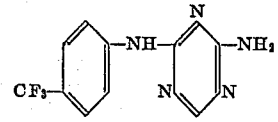

References Cited in the file of this patent

FOREIGN PATENTS

| | | |
|---|---|---|
| 168,063 | Austria | Apr. 10, 1951 |
| 676,024 | Great Britain | July 23, 1952 |

OTHER REFERENCES

Claude et al.: Magyar Kem Folyoirat, vol. 57, pp. 70–72 (1951) (abstract in Chemical Abstracts, vol. 46, pp. 4023–4024 (1952)).